United States Patent [19]

Bradbury

[11] Patent Number: 5,226,540
[45] Date of Patent: Jul. 13, 1993

[54] CARRYING CASE FOR A PORTABLE WORK STATION

[75] Inventor: George M. Bradbury, Bonsall, Calif.

[73] Assignee: The I.D.E.A. Corporation, Las Cruces, N. Mex.

[21] Appl. No.: 860,894

[22] Filed: Mar. 31, 1992

[51] Int. Cl.$^5$ .............................................. B65D 85/38
[52] U.S. Cl. .................................. 206/576; 206/320; 364/705.01; 364/708
[58] Field of Search ....................... 206/305, 320, 576; 190/109, 111, 115, 16, 17, 11; 364/705, 708, 705.01

[56] References Cited

U.S. PATENT DOCUMENTS

| | | | |
|---|---|---|---|
| 4,458,813 | 7/1984 | Tushinsky et al. | 206/320 |
| 4,669,001 | 5/1987 | Thrush | 206/320 |
| 4,744,446 | 5/1988 | Arney | 190/110 |
| 4,837,590 | 6/1989 | Sprague | 206/576 |
| 4,895,231 | 1/1990 | Yamaguchi et al. | 190/115 |
| 4,896,776 | 1/1990 | Kabanuk | 206/305 |
| 4,929,948 | 5/1990 | Holmberg | 190/110 |
| 5,010,988 | 4/1991 | Brown | 206/320 |
| 5,074,413 | 12/1991 | Ikuta et al. | 206/320 |
| 5,080,155 | 1/1992 | Crozier | 206/320 |
| 5,105,338 | 4/1992 | Held | 206/305 |

FOREIGN PATENT DOCUMENTS 0465739 5/1937 United Kingdom ................ 206/305

OTHER PUBLICATIONS

"It's a PC, Printer, Fax, Modem and Cellular Phone all in one Briefcase", Kase Marketing Brochure, no date.

Primary Examiner—Jimmy G. Foster
Attorney, Agent, or Firm—Hawes & Fischer

[57] ABSTRACT

An air and water tight carrying case in which to transport a portable work station having a personal computer, printer and other peripherals. External controls are provided at a bulkhead on the outside of the case to permit operation of the work station when the carrying case is closed, such as when the case is located in a hostile environment and it is desirable to isolate the computer hardware from the atmosphere. By virtue of the foregoing, power to the computer and peripherals, data transfer to and from the computer, and connection of the computer to auxiliary hardware can all be controlled from outside the carrying case without having to disturb the safe environment in which the work station is sealed.

18 Claims, 6 Drawing Sheets

CARRYING CASE FOR A PORTABLE WORK STATION

BACKGROUND OF THE INVENTION

1. Field of the Invention

This invention relates to an air and water tight carrying case that is adapted to safety transport a portable work station and permit the work station to be operated in a hostile environment while the case is closed.

2. Background Art

Portable work stations have been commercially available for several years. More particularly, a personal computer, printer and various other computer peripherals are packaged within a carrying case to facilitate the transport and storage of the work station. Being that the work station is controlled from inside the carrying case, it is necessary to first open the case (i.e. raise the lid) to gain access to the appropriate computer hardware. In the event that the work station has been transported for use in a hostile environment and the lid of the carrying case is raised, the hardware inside the case could be subjected to the adverse effects of moisture, sand, heat, cold and a corrosive atmosphere. As a consequence of the foregoing, the stability and reliability of the computer hardware may be undesirably effected thereby rendering the work station unsuitable for many data computing and transmitting operations.

It would therefore be preferable to have available a rugged, air and water tight carrying case in which to safely transport a work station for use in a hostile environment without subjecting the work station to possible damage. That is to say, it would be desirable to be able to operate the work station in a normal fashion in a non-hostile environment with the lid of the case open to permit manual access to the computer hardware. However, it would also be desirable to be able to operate the work station with the lid of the case closed so as to isolate the computer hardware from the atmosphere when the carrying case is transported to a hostile environment.

SUMMARY OF THE INVENTION

In general terms, an impact resistant, air and water tight carrying case is disclosed in which to safely transport a portable work station of the type having a notebook computer, printer and other peripherals, such as one or more of a cellular phone, modem, and internal DC power source. The carrying case includes a base in which the work station is stored and a lid that is hingedly attached to the base to be rotated between closed and opened positions. Located on a bulkhead at an exterior surface of the carrying case are a plurality of controls which permit the work station to be easily operated when the lid of the carrying case is closed upon the base, such as when the case is transported to a hostile environment and it is desirable to isolate the computer hardware from the atmosphere. In this manner, it is possible to operate the work station from outside the carrying case without having to disturb the safe environment in which the work station is sealed.

The controls at the exterior surface of the carrying case include an external phone connector, at which a handset can be connected to the cellular phone in the case. A DC power jack is provided at which to supply output power generated by the internal DC power source in the case. External parallel and serial ports are available at which to connect suitable auxiliary hardware to the respective parallel and serial ports of the computer in the case. An external keyboard connector and video input port are provided at which an external keyboard and video monitor can be connected to the computer. External power switches are also provided and connected between the internal power source and each of the computer and cellular phone to control the powering on and off of said computer and phone.

DETAILED DESCRIPTION

Figure 1:
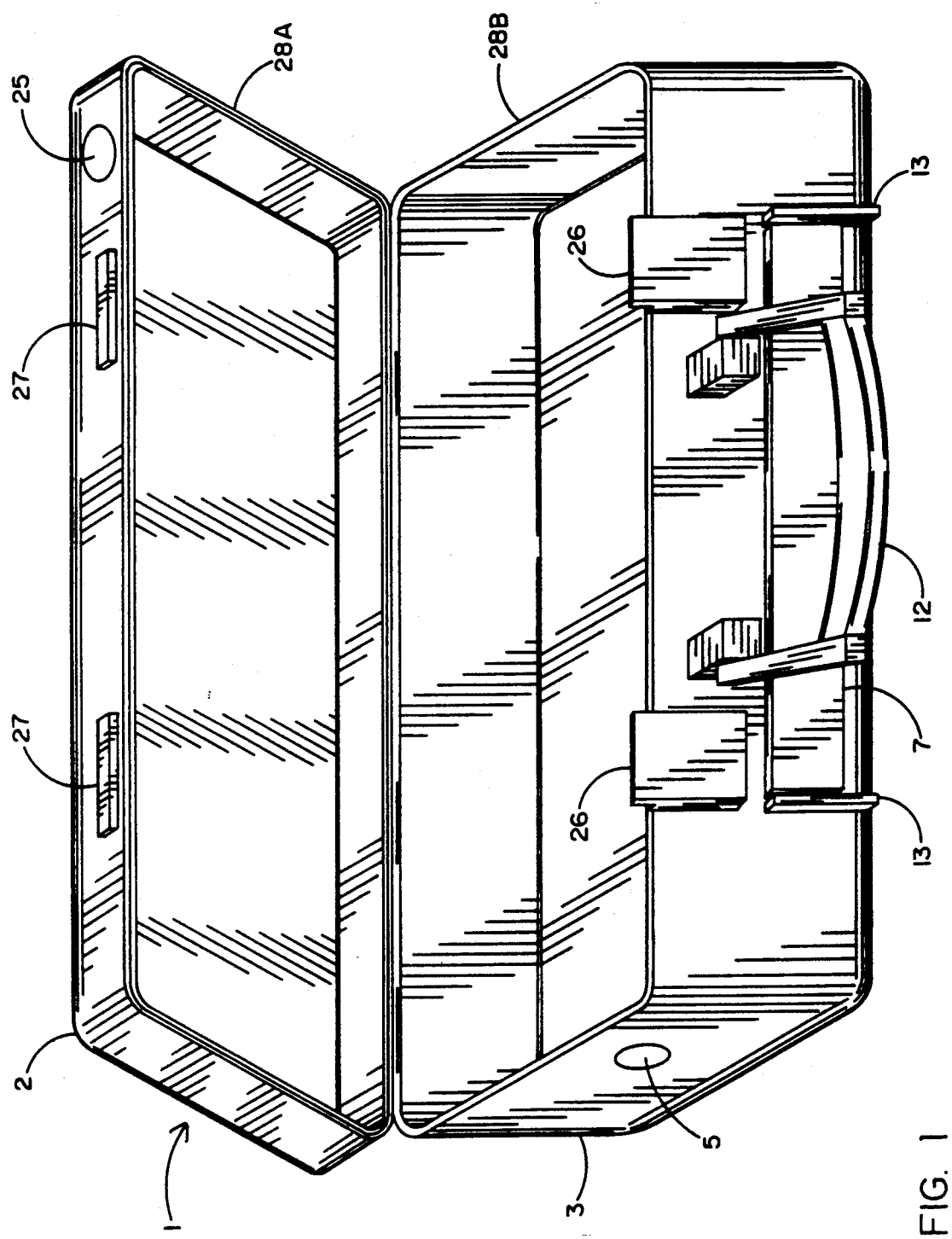
FIG. 1 is a front perspective view of the carrying case which forms the present invention and in which a portable work station may be received and safely transported.

Referring to FIG. 1 of the drawings, a carrying case is shown by which a work station including a computer, printer and other peripherals can be easily and safely transported in a water and air tight enclosure. Although the carrying case 1 is shown empty in FIG. 1, this is for convenience of illustration only and it is to be understood that case 1 will be filled with a suitable personal computer, printer and related peripherals. By way of example, reference may be made to my earlier filed patent application Ser. No. 822,065 entitled "MODULAR PORTABLE WORK STATION." In my earlier application, a portable work station is disclosed comprising a notebook computer, printer, cellular phone, handset, modem, digital camera, optical scanner, DC battery supply and battery charger. To this end, the details of the work station disclosed in my patent application Ser. No. 822,065 are incorporated by reference into the instant application. However, the work station disclosed in my earlier application is but one example of a preferred work station that can be carried within case 1. Nevertheless, it is to be understood that the precise configuration of the work station selected for transport in carrying case 1 is not to be regarded as a limitation of the present invention.

Figure 3:
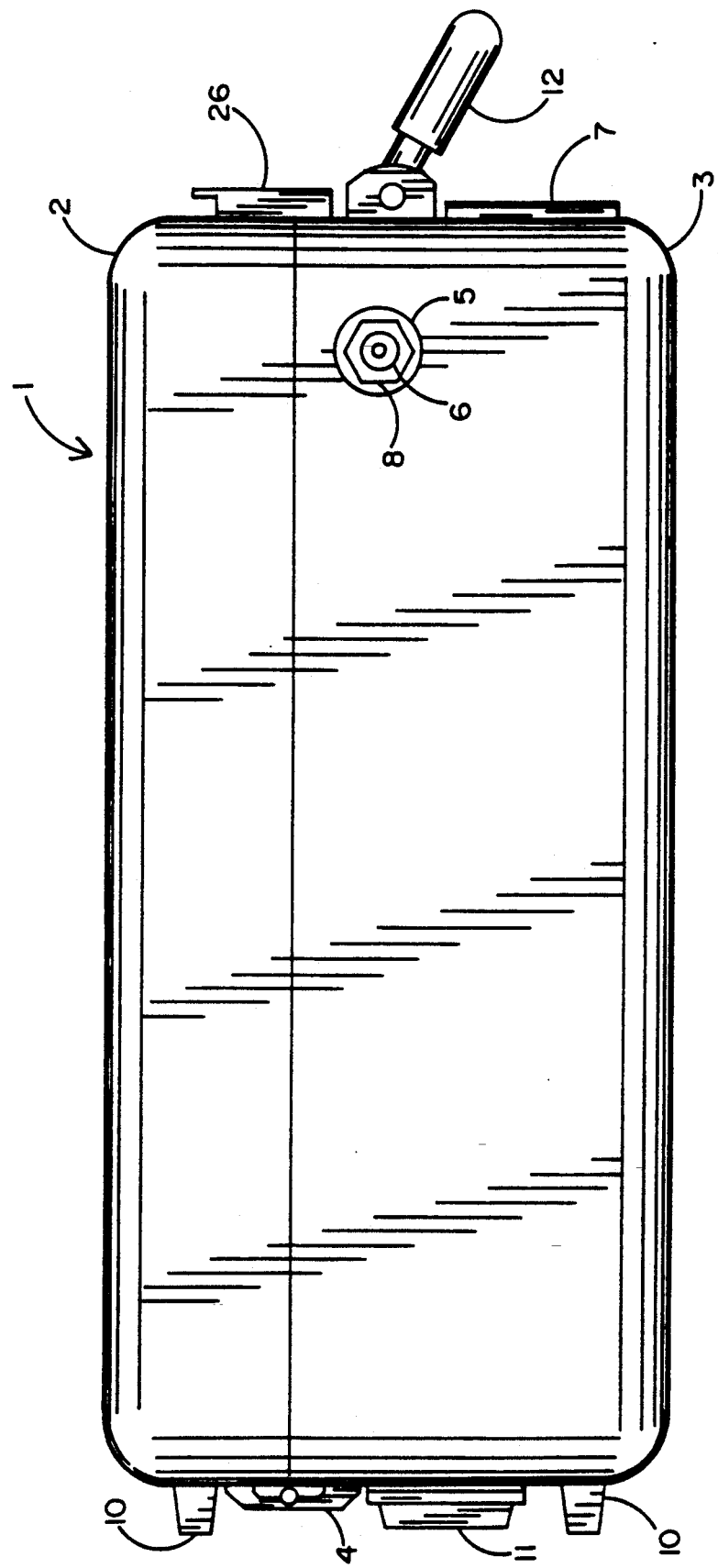
FIG. 3 is a side view of the carrying case.

The carrying case 1 is a rugged, shock resistant enclosure which has a rectangular lid 2 (shown in the raised position in FIG. 1) pivotally attached to a rectangular body 3 by means of conventional hinges (designated 4 in FIG. 3). The lid 2 and base 3 may be releaseably secured to one another in the closed position of carrying case by means of the usual latches on base 3 cooperating with opposing complementary catches 27 on lid 2. Likewise, the carrying case 1 is provided with a handle 12 (best shown in FIG. 3) attached to the front of base 3 to facilitate transport of the work station.

To prevent the invasion of water and airborne contaminants (e.g. dust and sand) into carrying case 1, a seal is provided between the lid 2 and base 3. That is, a peripheral groove 28B is formed around the upper-most edge of base 3. An O-ring 28A is located within an opposing groove formed around the lower-most edge of lid 2. Thus, with the carrying case 1 in the closed position (of FIG. 2), the O-ring seal 28A of lid 2 will be snugly received within the underlying peripheral groove 28B of base 3.

As one important advantage of the present invention, means are provided to power the computer and peripherals from an internal or external power source while the carrying case 1 is in the closed position. To this end, a hole 5 is provided through a side of the base 3 for receipt of an input DC power jack (designated 6 and best described when referring to FIG. 3). Similarly, a hole is formed in the top of lid 2 for receipt of an external transceiver antenna jack 25 (the details of which will be described hereinafter when referring to FIG. 5).

Figure 2:
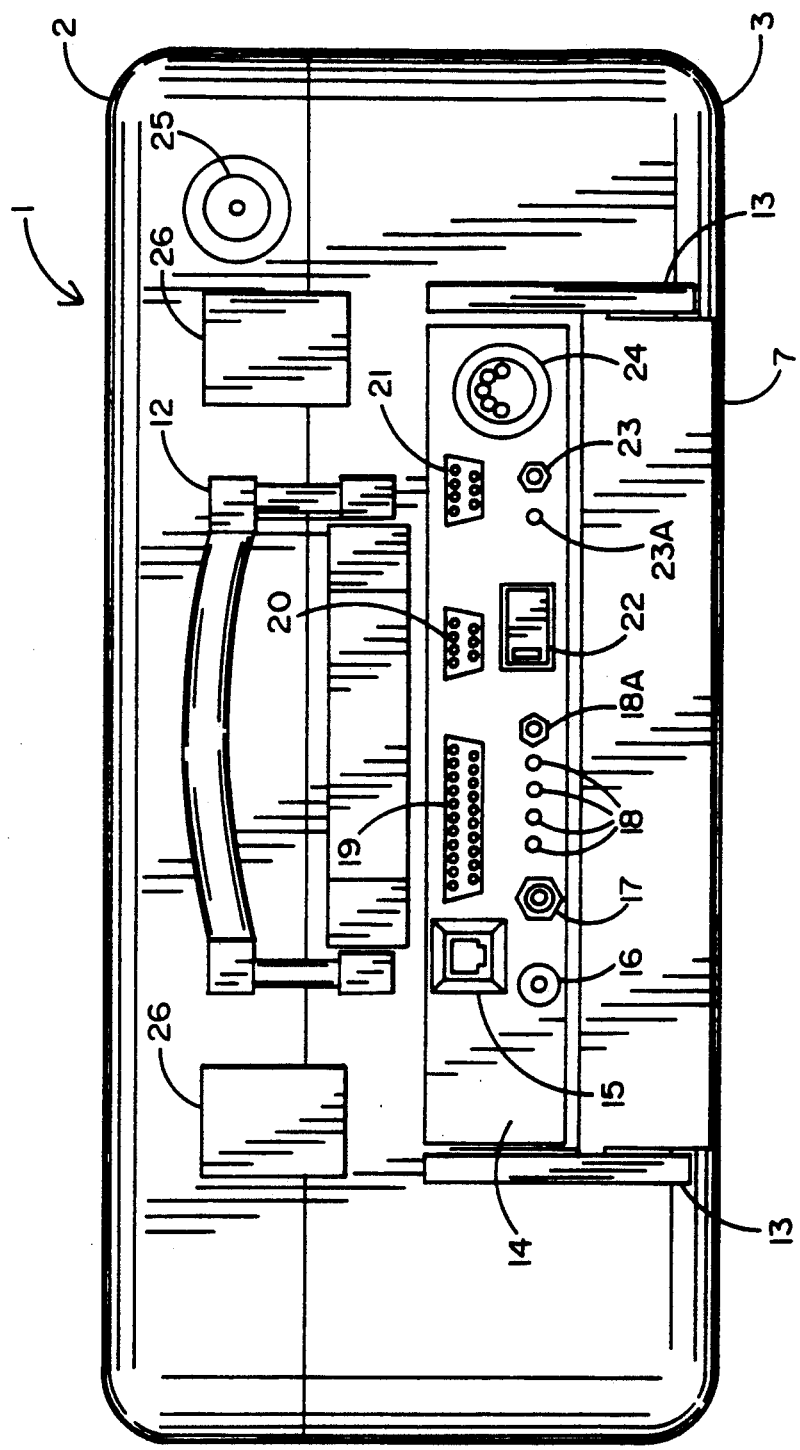
FIG. 2 is a front view of the work station of FIG. 1 showing the external controls by which the work station may be used when the case is closed.

FIG. 2 of the drawings shows the carrying case 1 in the closed position with the lid 2 rotated downwardly atop the base 3. As another important advantage of the present invention, an external bulkhead 14 is affixed to the front of base 3 for supporting a plurality of external controls (i.e. switches and input jacks) by which the work station may be operated without lifting the lid 2 off base 3. To shield the external switches and jacks at bulkhead 14 from the environment in which carrying case 1 may be located when the work station is not in use, a bulkhead cover 7 is slidably disposed relative to bulkhead 14. The bulkhead cover 7 is carried between a pair of opposing bulkhead cover guides 13. The bulkhead cover 7 is adapted to slide back and forth along guides 13 from a first position above the base 3 at which to cover the bulkhead 14 (as shown in FIG. 1), when access thereto is not required, to a second position at which to expose the bulkhead 14 (as shown in FIG. 2), when access thereto is required for operating the work station.

By way of particularly example, the controls supported by bulkhead 14 for operating the work station when carrying case 1 is either in the opened or closed position include an external phone connector 15. The phone connector 15 is interconnected with the cellular telephone (best shown in FIG. 6) inside the case. When the carrying case 1 is closed, as shown in FIG. 2, the operator may attach an auxiliary handset (not shown) to phone connector 15 to use the cellular phone without raising the lid 2. In the event that the lid is otherwise raised off the base 3, the phone connector 15 can be used for facsimile communications or for transferring data to and from an auxiliary computer (also not shown) that is remotely located relative to case 1.

A common ground 16 is provided at bulkhead 14 so that all electrical grounds may be connected together at a single junction. For example, it may be desirable to eliminate any floating grounds that may exist when the work station is interfaced with auxiliary equipment in the field.

Figure 6:
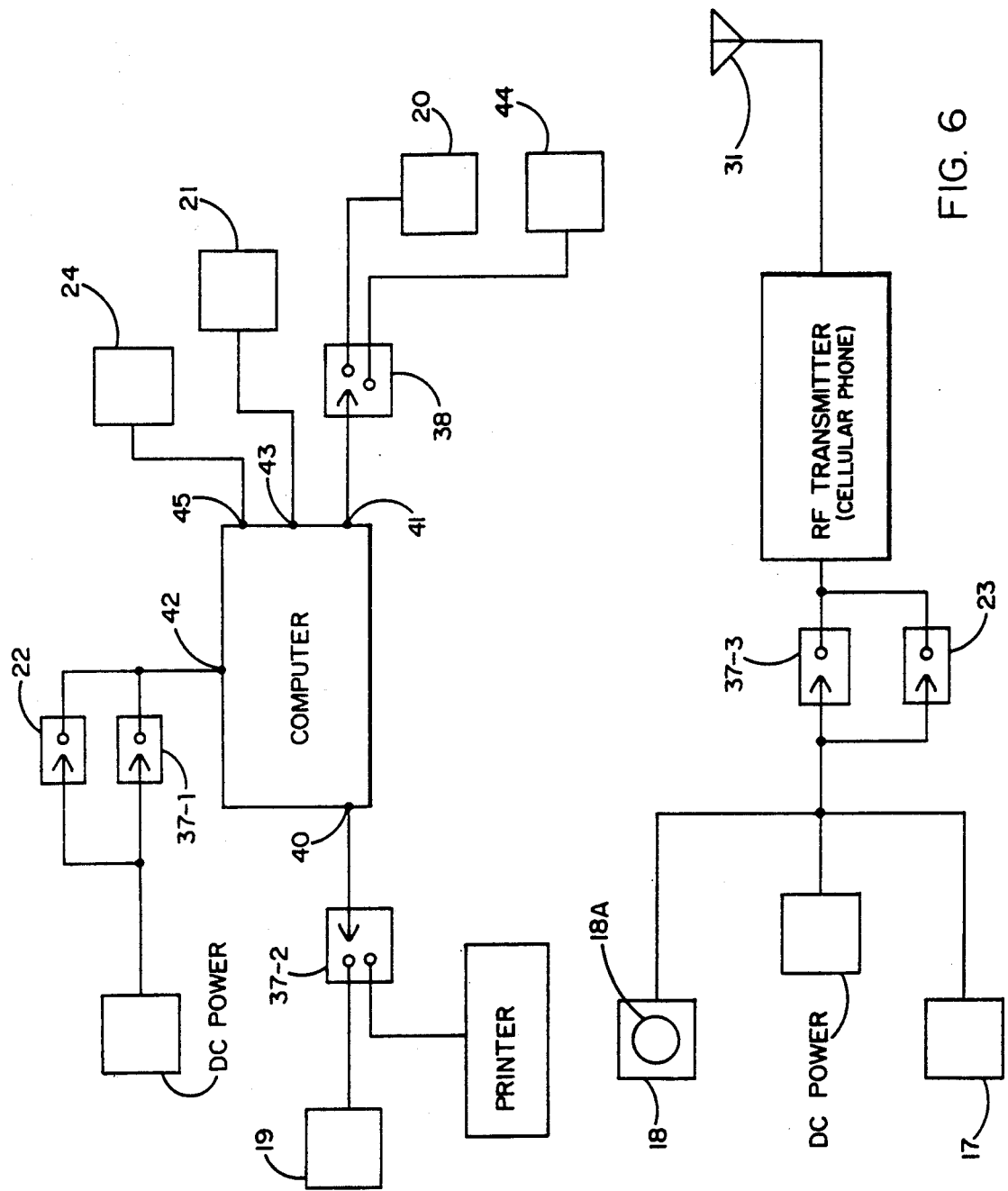
FIG. 6 is a block diagram to illustrate operation of the work station with the carrying case either opened or closed.

Also provided at bulkhead 14 is a DC power jack 17 at which is available a supply of internally generated DC voltage (best represented in FIG. 6). Such DC voltage is produced by the 12 volt battery within the carrying case 1. The DC output voltage may be supplied to any suitable external DC driven apparatus via jack 17.

To this end, a battery level indicator is provided to indicate the charge remaining on the internal 12 volt battery. The battery level indicator includes a series of indicator (e.g. LED) lamps 18 which are illuminated in response to the manual activation of an adjacent push-to-test button 18A. The particular lamp or lamps 18 that are illuminated when button 18A is depressed produces a visual indication whether the battery has sufficient charge left to power both internal or external apparatus.

Of particular advantage to the present invention is the ability to access the parallel port of the computer with the carrying case in the closed position. In this regard, an external parallel port 19 is provided at bulkhead 14 and connected to the parallel port of the computer (designated 40 in FIG. 6). As will be described when referring to FIG. 6, when the printer of the work station is not in use, the external parallel port 19 can be selectively switched into connection with the parallel port 40 of the computer. In this manner, a floppy disk drive (not shown), auxiliary printer, and other external peripheral devices can be interfaced with the computer at port 19.

Of similar importance to the present invention is the ability to access the serial port of the computer with the carrying case 1 in the closed position. In this regard, an external serial port 20 is provided at bulkhead 14 and connected with the serial port of the computer (designated 41 in FIG. 6). As will be described when referring to FIG. 6, the external serial port 20 can be selectively switched into connection with the serial port 41 of the computer. In this manner, the serial port 20 can receive serial data from auxiliary communications and data entry devices.

Likewise, an external video port 21 is provided at bulkhead 14 and connected to the video input port of the computer (designated 43 in FIG. 6) to permit access to the computer video port with a carrying case 1 in the closed position. In this manner, an external video monitor (not shown) can be connected to the computer via external video port 21 without having to open the lid 2 of case 1.

In order to have the ability to selectively energize the computer when the carrying case 1 is in the closed position, an external computer power switch 22 is provided at bulkhead 14. As is best shown in FIG. 6, power switch 22 is connected between a DC power supply and the computer. Thus, by manually operating switch 22, the computer can be powered on or off without having to open the lid 2 of case 1.

In order to have the ability to selectively energize a transceiver (i.e. the cellular phone) with carrying case 1 in the closed position, an external transceiver power switch 23 is provided at bulkhead 14. As is best shown in FIG. 6, power switch 23 is connected between the DC power supply and the transceiver or RF transmitter. By manually operating switch 23, the transceiver can be powered on and off without having to open the lid 2 of case 1. The transceiver has an adjacent indicator (e.g. LED) lamp 23A associated therewith to provide a visual indication when power is being supplied thereto.

With the carrying case 1 in the closed position and power supplied to the computer (e.g. by operating external computer power switch 22), it is sometimes desirable to access the computer of the portable work station by means of an external keyboard. In this regard, an external keyboard connector 24 is provided at bulkhead 14 and connected to the keyboard input port of the computer (designated 45 in FIG. 6). In this manner, an external keyboard (not shown) may be connected to the computer via keyboard connector 24 and input port 45 so as to be used in combination with an external video monitor connected to the external video port 21 to enable the operator to enter and retrieve data, and the like, without having to open the lid 2 of case 1.

Referring now to FIG. 3 of the drawings, the hole 5 (previously disclosed when referring to FIG. 1) is shown located within one side of the base 3. Recessed within hole 5 is an input DC power jack 6 that is held in coaxially alignment therewith by means of a conventional jack retaining nut 8. Thus, power can be supplied to the work station via power jack 6 from a remote DC power source (e.g. an automobile battery or other available 12 volt source) without having to raise the lid 2 to open case 1.

FIG. 3 also shows an array of feet 10 attached to the rear of the lid 2 and base 3 of case 1. An optional stabilizer bar 11 is also shown attached to the rear of base 3. The stabilizer bar 11 and the feet 10 provide stability to the carrying case 1 when said case is standing upright in a vertical position.

Figure 4:
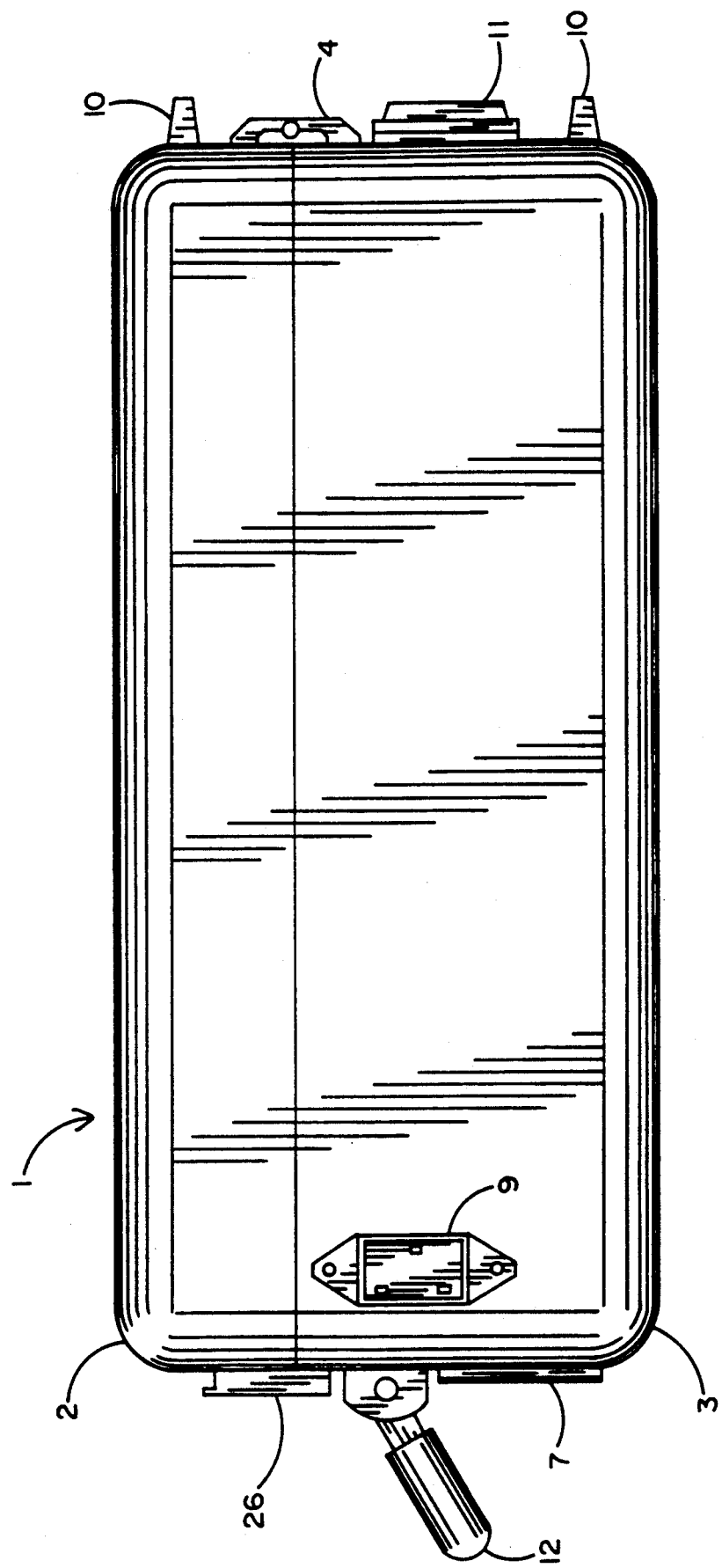
FIG. 4 is an opposite side view of the carrying case.

In FIG. 4 of the drawings, the opposite side of the base 3 is shown within which is disposed an input AC power jack 9 that is connected to the battery charger inside the carrying case 1. While the DC power jack 6 of FIG. 3 at one side of base 3 permits the work station to be powered from an external DC source (such as a 12 volt automobile battery), the AC power jack 9 at the opposite side permits the battery charger to be powered from a remote AC source (e.g. any available 110 volt AC power supply). Hence, the operator will be able to connect external sources of AC and DC voltage to the carrying case 1 when said case is located in the field.

Figure 5:
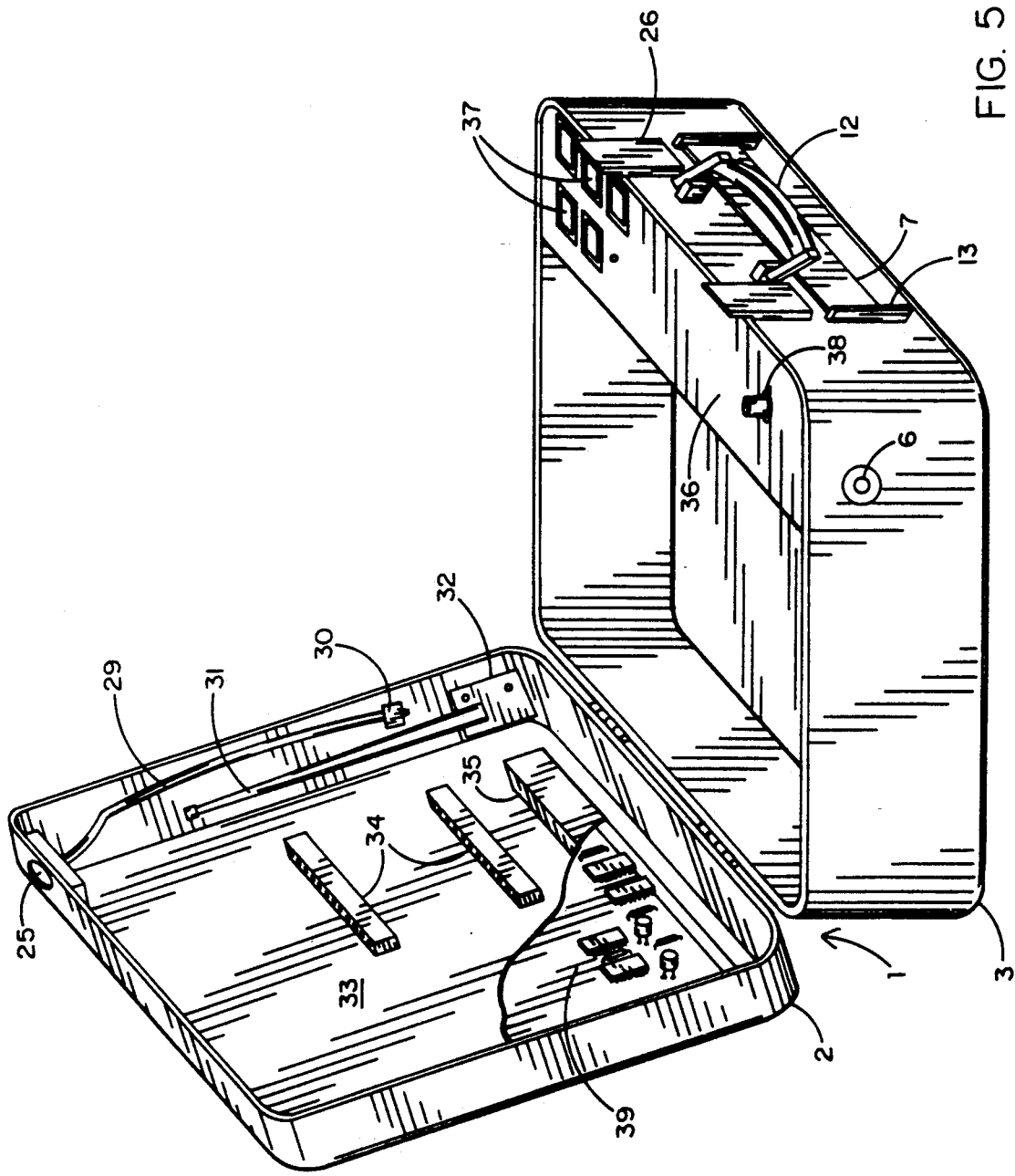
FIG. 5 shows the carrying case in an opened position with the work station removed therefrom.

Referring to FIG. 5 of the drawings, the work station within case 1 is shown provided with both internal and external antenna capabilities with regard to the cellular phone while the carrying case 1 is in either the closed or opened positions. That is, an internal antenna 31 is detachably connected to the cellular phone at an internal mounting bracket 32 along one side of the lid 2. When an external antenna capability is desired at certain work sites where a boost in power is needed, the internal antenna may be detached from bracket 32. In this case, an external antenna wire 29 which is carried alongside antenna 31 is interconnected with the cellular phone at antenna mounting bracket 32. The external antenna wire 29 has an external antenna connector 30 affixed to one end thereof to be mated to mounting bracket 32. The opposite end of antenna wire 29 is interconnected with the external transceiver antenna jack 25 at the front of lid 2 (previously described when referring to FIG. 1). Antenna jack 25 is adapted to be interconnected with a high gain antenna (not shown) by which to increase the transmission range of the cellular phone when the internal antenna 31 is not adequate for use in remote (e.g. desert or ocean) locations.

FIG. 5 also shows the carrying case 1 in the open position with the lid 2 raised off the base 3 to expose a first shroud 33 spaced below and extending across the lid 2 and a second shroud 36 spaced above and extending across the forward end of base 3. A pair of slots are formed in the first shroud 33 to receive respective back plane connectors 34. Each back plane connector 34 is adapted to be mated to a custom expansion board (not shown) which is commercially available to increase the capability of the computer of the work station. As yet another important advantage of the present invention, a mother board 39 is located in the space between the lid 2 and the shroud 33. The mother board 39 is typically a printed circuit expansion board which contains the electronics for interfacing and controlling the expansion boards that are plugged into connectors 34 with the expansion ports of the computer in case 1. In this manner, the computer can be provided with additional external capabilities (such as increased memory, telemetry, and the like). The shroud 33 which covers and protects the mother board 39 also includes a raised portion 35 to accommodate the usual power supply (not shown) that is interconnected with board 39 to power the expansion boards plugged into connectors 34. Thus, and by virtue of the foregoing, the electronics necessary for expanding the normal function of the computer are efficiently and conveniently carried and protected in the lid 2 above the shroud 33 thereof.

The carrying case 1 includes a plurality of manually operated function switches that are accessible at the second shroud 36 of base 3 when the lid 2 is raised off the base. More particularly, a serial port switch (e.g. a rotatable knob) 38 at shroud 36 is movable between first and second switch positions to selectively connect the serial port of the computer (designated 41 in FIG. 6) to either an internal serial port (designated 44 in FIG. 6 and disposed within the base 3 of case 1) or the external serial port (designated 20 and previously described when referring to FIG. 2). In addition, a switch panel is located atop shroud 36 which includes selectively operable switches 37 that permit the work station to be controlled from inside the case. The function of switches 37 will be described in greater detail when referring to FIG. 6.

Referring now to FIG. 6 of the drawings, a block diagram is provided to illustrate the internal and external operation of the portable work station within the carrying case 1 when the case is in the opened and closed positions. More particularly, internal and external switches are provided to connect a DC power source to the DC input power port 42 of the computer. As previously disclosed, the DC power source may be either a 12 volt automobile battery or the 12 volt battery or battery charger of the work 15 station. The external power switch 22 (located at bulkhead 14 in FIG. 2) may be closed when the carrying case 1 is closed to connect the power source to power port 42. Alternatively, an internal switch 37-1 (located at shroud 36 in FIG. 5) may be closed when the carrying case is opened to connect the DC source to power port 42.

A second internal switch 37-2 (also located at shroud 36) may be closed to connect the printer of the work station to the parallel port 40 of the computer. Alternatively, when use of the printer is not desired or required, the switch 37-2 can be opened to connect the external parallel port 19 (at bulkhead 14 in FIG. 2) to the parallel port 40 of the computer.

As earlier described, with the case 1 in the opened position, the serial port switch 38 (at shroud 36 in FIG. 2) can be rotated to a first switch position to connect the internal serial port 44 to the serial port 41 of the computer. Alternatively, switch 38 can be rotated to a second switch position to connect the external serial port 20 (at bulkhead 14 in FIG. 2) to the serial port 41 of the computer.

Another internal switch 37-3 (located at shroud 36 of FIG. 5) may be closed when the carrying case 1 is opened so as to connect the aforementioned DC power source to the RF transmitter (i.e. cellular phone). Alternatively, the external transceiver power switch 23 (at bulkhead 14) may be closed when the carrying case 1 is closed so as to power the RF transmitter from the same DC power source.

By virtue of the foregoing, it can be appreciated that the work station can be easily used whether the carrying case 1 is opened or closed. However, should it be necessary to transport the carrying case to a hostile and/or remote environment, the work station can be efficiently operated with the case closed and without having to disturb the safe environment in which the work station is sealed.

It will be apparent that while a preferred embodiment of the invention has been shown and described, various modifications and changes may be made without departing from the true spirit and scope of the invention.

Having thus set forth the preferred embodiment, what is claimed is:

1. For transporting a portable work station including at least a computer, a carrying case for enclosing said work station and comprising a base for receiving said work station and a lid movable to opened and closed positions relative to the base, said carrying case further comprising first and second sets of manually accessible controls, said first set of controls located at an exterior surface of said carrying case and electrically connected to the computer to enable said computer to be controlled when the lid of said carrying case is in either the opened or closed positions relative to the base and said second set of controls located at the interior of said carrying case and connected to the computer to enable the computer to be energized when the lid of said carrying case is in the opened position, said first set of manually accessible controls at the exterior surface of said carrying case including a power switch to be electrically connected between a source of power and the computer so as to energize said computer when the lid of said carrying case is in the closed position.

2. The carrying case recited in claim further comprising a cover supported at said exterior surface of said carrying case and movable from a first position at which to cover said first set of controls to a second position at which to expose said controls and thereby permit manual access thereto.

3. The carrying case recited in claim 1, wherein one of said first set of controls at the exterior surface of said carrying case is an external parallel port electrically connected to the computer within said case.

4. The carrying case recited in claim 1, wherein one of said first set of controls at the exterior surface of said carrying case is an external serial port electrically connected to the computer within said case 5. The carrying case recited in claim 1, wherein one of first set of controls at the exterior surface of said carrying case is an external video port electrically connected to the computer within said case.

6. The carrying case recited in claim 1, wherein one of said first set of controls at the exterior surface of said carrying case is an external keyboard connector electrically connected to the computer within said case.

7. The carrying case recited in claim 1, said work station also including a cellular phone located inside said carrying case to be electrically connected to said power source to provide power to said phone, said first set of controls at the exterior surface of said carrying case also including an additional power switch electrically connected between the power source and the cellular phone to control the supply of power from said source to said phone.

8. The carrying case recited in claim 7, further comprising an external antenna jack located on the outside of said case and manually accessible when the lid of said case is in the closed position relative to said base, and an antenna wire located within said case and extending between said antenna jack and said cellular phone.

9. The carrying case recited in claim 1, further comprising a circuit board carried at the lid and interconnected with the computer, and at least one backplane connector electrically connected to said computer via said circuit board.

10. The carrying case recited in claim 9, further comprising a shroud extending across and spaced from the lid, said circuit board located in the space between the lid and the shroud, and said backplane connector attached to said circuit board and projecting outwardly from said shroud through a slot formed therein.

11. A carrying case for enclosing and transporting a portable work station including at least a computer, said carrying case comprising:
a base for receiving the computer and a lid attached to the base and moveable between opened and closed positions relative to the base;
a first set of controls located at the interior of the base and electrically connected to the computer to control said computer when the lid is in an opened position relative to said base;
a second set of controls located on the outside surface of the base and electrically connected to the computer to control said computer when the lid is in either the opened or closed position relative to said base;
a circuit board carried at the lid and interfaced with the computer; and
at least one backplane connector electrically connected to said computer via said circuit board.

12. The carrying case recited in claim 11, further comprising a shroud extending across and spaced from the lid, said circuit board located in the space between the lid and the shroud, and said backplane connector attached to said circuit board and projecting outwardly from said shroud through a slot formed therein.

13. The carrying case recited in claim 11, wherein one of said second set of controls located on the outside surface the base of said carrying case is a power switch to be electrically connected between a source of power and the computer so as to energize said computer when the lid of said carrying case is in the closed position.

14. The carrying case recited in claim 11, further comprising a cover supported on the outside surface of the base of said carrying case and movable from a first position at which to cover said second set of controls on said outside surface to a second position at which to expose said controls and thereby permit manual access thereto.

15. The carrying case recited in claim 11, wherein said portable work station also includes a cellular phone received within the base of said carrying case, one of said second set of controls located on the outside surface of said base being a power switch to be electrically connected between a source of power and the cellular phone so as to energize said phone when the lid of said carrying case is in the closed position.

16. The carrying case recited in claim 15, further comprising an external antenna jack located on the outside surface of said case and manually accessible when the lid of said case is in the closed position relative to said base, and an antenna wire located at the interior of said case and extending between said antenna jack and said cellular phone.

17. For transporting a portable work station including at last a computer, a cellular phone, and a power source connected to said phone and to said computer, a carrying case enclosing said work station and comprising a base for receiving said work station and a lid movable to opened and closed positions relative to the base, said carrying case further comprising a set of manually accessible controls located on an exterior surface of said carrying case and electrically connected to each of said cellular phone and said computer to enable said phone and computer to be controlled when the lid of said carrying case is in either the opened or closed positions relative to the base, said set of manually accessible controls on the exterior surface of said carrying case including a power switch to be electrically connected between said cellular phone and said power source so as to energize said phone when the lid of said carrying case is in the closed position.

18. The carrying case recited in claim 17, said set of manually accessible controls on the exterior surface of said carrying case also including an additional power switch to be electrically connected between said computer and said power source so as to energize said computer when the lid of said carrying case is in the closed position.

* * * * *